(12) United States Patent
Fuglestad

(10) Patent No.: US 11,168,522 B2
(45) Date of Patent: Nov. 9, 2021

(54) PULLING TOOL FOR USE IN A WELLBORE AND/OR TUBING AND A PROPULSION MODULE OF A PULLING TOOL

(71) Applicant: Well Conveyor AS, Bryne (NO)

(72) Inventor: Kenneth Fuglestad, Bryne (NO)

(73) Assignee: WELL CONVEYOR AS, Bryne (NO)

( * ) Notice: Subject to any disclaimer, the term of this patent is extended or adjusted under 35 U.S.C. 154(b) by 0 days.

(21) Appl. No.: 16/628,508

(22) PCT Filed: Jul. 4, 2018

(86) PCT No.: PCT/NO2018/050176
§ 371 (c)(1),
(2) Date: Jan. 3, 2020

(87) PCT Pub. No.: WO2019/009734
PCT Pub. Date: Jan. 10, 2019

(65) Prior Publication Data
US 2020/0157886 A1  May 21, 2020

(30) Foreign Application Priority Data

Jul. 6, 2017  (NO) .................................. 20171119

(51) Int. Cl.
*E21B 23/14* (2006.01)
*E21B 4/00* (2006.01)
*E21B 4/18* (2006.01)
*E21B 23/00* (2006.01)

(52) U.S. Cl.
CPC ................ *E21B 4/006* (2013.01); *E21B 4/18* (2013.01); *E21B 23/001* (2020.05); *E21B 23/14* (2013.01)

(58) Field of Classification Search
CPC . E21B 23/14; E21B 4/006; E21B 4/18; E21B 23/001
See application file for complete search history.

(56) References Cited

U.S. PATENT DOCUMENTS

| | | | |
|---|---|---|---|
| 4,969,376 A | 11/1990 | Fickelscher | |
| 5,937,710 A | 8/1999 | Gould et al. | |
| (Continued) | | | |

FOREIGN PATENT DOCUMENTS

| | | |
|---|---|---|
| EP | 2 505 765 | 10/2012 |
| NO | 20160042 | 7/2017 |
| (Continued) | | |

OTHER PUBLICATIONS

International Search Report dated Oct. 3, 2018 in corresponding International Application No. PCT/NO2018/050176.
(Continued)

*Primary Examiner* — D. Andrews
(74) *Attorney, Agent, or Firm* — Wenderoth, Lind & Ponack, L.L.P.

(57) ABSTRACT

A pulling tool for use in a wellbore or tubing for pulling cable includes a propulsion module having a main section and a propulsion arm hinged to the main section. The propulsion arm includes a complete propulsion wheel with a gear system. An electric motor is configured to drive the complete propulsion wheel via the gear system. The gear system may include a harmonic gear or a compound split ring epicyclic gear.

15 Claims, 10 Drawing Sheets

(56) References Cited

U.S. PATENT DOCUMENTS

| | | | |
|---|---|---|---|
| 6,273,189 B1 * | 8/2001 | Gissler | E21B 4/18 166/241.1 |
| 2014/0014365 A1 * | 1/2014 | Hallundbæk | E21B 4/006 166/381 |
| 2015/0075310 A1 | 3/2015 | Lunin et al. | |
| 2015/0285355 A1 | 10/2015 | Lin | |
| 2016/0061308 A1 | 3/2016 | Oishi | |
| 2019/0040698 A1 | 2/2019 | Fuglestad | |

FOREIGN PATENT DOCUMENTS

| | | |
|---|---|---|
| WO | 00/46481 | 8/2000 |
| WO | 2006/115418 | 11/2006 |
| WO | 2014/081305 | 5/2014 |

OTHER PUBLICATIONS

Norwegian Search Report dated Feb. 20, 2018 in corresponding Norwegian Application No. 20171119.

* cited by examiner

PULLING TOOL FOR USE IN A WELLBORE AND/OR TUBING AND A PROPULSION MODULE OF A PULLING TOOL

This invention relates to a pulling tool and to a propulsion module of a pulling tool used for pulling itself and other equipment into wellbores and tubing.

BACKGROUND OF THE INVENTION

Wellbores and tubing typically include long vertical and horizontal runs. In many wells there is a need for installing a fiber optic cable in order to obtain real-time measurements of flow, pressure, and temperature, among other things. In itself, a fiber optic cable is very thin and weak. Therefore, several types of claddings are used for protecting the fiber optic cable such as metal, Kevlar, or carbon rods. Common to all these cables are that they are very lightweight and a bit flexible, which present some challenges when they are to be installed in horizontal wells.

Since a fiber optic cable is a signal cable only, the pulling tool needs to be battery operated. Therefore, it is essential that the pulling tool is as efficient and lightweight as possible to limit the necessary power consumption. Currently, no pulling tool exists that is specially designed for these applications.

In addition to fiber optic cable installation, there is also a need for a pulling tool for performing light slick line well interventions. Similarly to a fiber optic cable, the same challenges are encountered when a slick line is to be run into horizontal wells. Due to the limited rigidity of the slick line, it cannot be pushed very far into horizontal wells. To be able to perform light well interventions by way of slick line in horizontal wells, a battery operated pulling tool is needed.

Wells in which there is a need for running light well interventions have small internal diameters and have nipple profiles as small as 40 mm. It is necessary, therefore, to construct the pulling tool small enough to be able to pass through the smallest nipple profiles. To enable this, known gearing solutions are used in a new manner herein. The diameter of the well may be larger than the combined diameters of the pulling tool and the cable to be pulled by the pulling tool.

Several variants of pulling tools or well tractors are available in the market. A known solution includes an electric motor driving a hydraulic pump which in turn drives a hydraulic motor of the propulsion wheel. Such a system is technically complex and not very efficient. Other variants available use an electric motor that transfers the rotation directly by way of an angular gear and on to the wheel either by way of chain/belt drive or straight gears. Such systems present a challenge in that the gear ratio is not sufficiently high to allow the use of a high efficiency, brushless permanent magnet motor operating at a relatively high RPM. It is known to include a planetary gear inside the propulsion wheel, the moving outer gear wheel of which planetary gear constitutes the propulsion wheel of the pulling tool, in order to reduce the rotational speed between the motor and the propulsion wheel. However, there is a limitation on how small a planetary gear can be made since such a gear includes a number of components located inside each other, each of which needs to resist the torque applied. In addition, the achievable gear ratio is relatively low.

WO2014/081305 discloses a pulling tool or well tractor having a drive module for a wellbore. The well tractor includes a drive module housing and a hydraulically actuated and rotatably mounted drive arm including a drive wheel.

EP2505765 discloses a downhole driving unit for insertion into a well. The driving unit includes a driving unit housing, a hydraulic motor and a single hydraulic motor housing. A wheel assembly includes a stationary part and a rotational part and a planetary gearing system.

SUMMARY OF THE INVENTION

Through the present invention a robust and efficient gear system having a higher gear ratio than those provided by existing systems is obtained. In general, smaller diameter motors operate at higher RPMs and it is therefore desirable to have a higher gear ratio between the motor and the propulsion wheel. By this invention, a higher gear ratio is obtained in a more compact design, and consequently a higher gear ratio between the motor and the propulsion wheel is provided.

As compared to a planetary gear solution of the same size, this invention provides a gear ratio that is 5-10 times higher within the same dimensions.

Another object of the invention is to be able to construct a pulling tool of smaller diameter than the pulling tools currently available in the market. Through the present invention a small-sized, lightweight, high performance propulsion unit which is preferably battery-operated is obtained.

The present invention relates to a pulling tool for use in a wellbore or tubing for pulling cable. The pulling tool comprises a propulsion module having a main section and a propulsion arm hinged to the main section. The propulsion arm includes a propulsion wheel with a gear system. The pulling tool further comprises an electric motor for driving the propulsion wheel via the gear system. The gear system of the propulsion wheel includes a fixed internal gear rim, an internal gear rim inside the propulsion wheel, and an input shaft coaxially positioned relative to the fixed internal gear rim and the internal gear rim of the propulsion wheel. Herein, a "fixed internal gear rim" is intended to refer to a stationary or non-rotating internal gear rim. At least one externally toothed body meshes with the fixed internal gear rim and the internal gear rim of the propulsion wheel. The fixed internal gear rim and the internal gear rim of the propulsion wheel have a different number of teeth. The at least one externally toothed body is driven via the input shaft.

The at least one externally toothed body may be a flexible toothing supported by way of a flexible bearing against a wave generator driven by the input shaft. The gear system of the propulsion wheel forms a harmonic gear.

Herein, a "wave generator" is intended to refer to the internal element of a harmonic gear that actuates and bends the flexible toothing element. Typically, such elements are oval and rotate about a center line so that the flexible toothing element engages internal teeth on both sides of the element.

The at least one externally toothed body may include planet wheels in a planet wheel carrier. The planet wheel carrier is able to rotate freely about its axis of rotation, with the input shaft driving a sun wheel meshing with the planet wheels. The planet wheels mesh with the fixed internal gear rim and the internal gear rim of the propulsion wheel. In this embodiment, the gear system of the propulsion wheel forms a two-ring compound epicyclic split ring gear of which one ring forms the fixed internal gear rim and the other ring forms the internal gear rim of the propulsion wheel.

The ability of the planet wheel carrier to rotate freely about its axis of rotation is intended to indicate that its sole purpose is to steer/support the planet wheels as they orbit around the sun wheel. The planet wheel carrier is not used for any driving purpose.

Planet wheels may have the same number of teeth along their entire widths. The number of planet wheels is not indicated as this is of no importance other than to the distribution of the forces applied to the teeth. Typically, the number of planet wheels may vary depending on how many planet wheels can be accommodated.

The fixed internal gear rim and of the internal gear rim of the propulsion wheel may be of the same internal diameter. The phrase «the same internal diameter», is also intended to include the same diameter of the toothing pitch circle and not necessarily of the smallest diameter at the tip of the teeth or at the base of the teeth.

The electric motor may include a rotor having an anchor with an output shaft and a pinion fixed to the output shaft.

The electric motor may be a brushless motor having a longitudinal axis being perpendicular to a rotational axis of the propulsion wheel, with the pulling tool further comprising a controller for the brushless motor.

An electric actuator can be provided between the main section and the hinged propulsion arm, whereby the hinged propulsion arm is configured for assuming a first retracted position inside the propulsion module and a second actuated position against a wellbore or tubing wall.

The invention further comprises a propulsion module of a pulling tool for use in a wellbore and/or tubing, comprising a main section and a propulsion arm hinged to the main section, the propulsion arm having a propulsion wheel with a gear system, the propulsion module further comprising an electric motor for driving the propulsion wheel via the gear system. The propulsion module includes a fixed internal gear rim, an internal gear rim inside the propulsion wheel, an input shaft coaxially positioned relative to the fixed internal gear rim and the internal gear rim of the propulsion wheel, and at least one externally toothed body meshing with the fixed internal gear rim and the internal gear rim of the propulsion wheel. The fixed internal gear rim and the internal gear rim of the propulsion wheel have different numbers of teeth. The at least one externally toothed body is driven via the input shaft.

The at least one externally toothed body may be a flexible toothing supported by way of a flexible bearing against a wave generator driven by the input shaft, whereby the gear system of the propulsion wheel forms a harmonic gear.

The at least one externally toothed body may include planet wheels in a planet wheel carrier, with the planet wheel carrier being able to rotate freely about its axis of rotation. The input shaft drives a sun wheel meshing with the planet wheels.

The planet wheels mesh with the fixed internal gear rim and the internal gear rim of the propulsion wheel. The gear system of the propulsion wheel forms a two-ring compound epicyclic split ring gear of which one ring forms the fixed internal gear rim and the other ring forms the internal gear rim of the propulsion wheel.

Planet wheels may have the same number of teeth along their entire widths.

The fixed internal gear rim and the internal gear rim of the propulsion wheel may be of the same internal diameter.

The electric motor may include a rotor having an anchor with an output shaft and a pinion fixed to the output shaft.

The electric motor may be a brushless motor having a longitudinal axis being perpendicular to a rotational axis of the propulsion wheel, with the pulling tool further including a controller for the brushless motor.

The present invention discloses a slick line and/or fiber optic cable pulling wellbore and/or tubing pulling tool including a propulsion module having a main section. A propulsion arm is hinged to the main section, the propulsion arm having a propulsion wheel with a gear system. The gear system of the propulsion wheel includes an internally toothed gear system having a fixed internal gear rim and a rotary internal gear rim. The moving internal gear rim the internal toothing and forms the propulsion wheel of the pulling tool. An electric motor for driving the propulsion wheel via the gear system is located in the hinged propulsion arm.

A "slick line", as the term is used herein, may also include an electric cable or a signal cable.

In the present invention, a high efficiency, high RPM, low torque, submergible brushless motor can be used which exhibits good moisture resistance and wear resistance and does not lose power and efficiency over time. This is enabled through the use of a gear system inside the propulsion wheel that includes an internally toothed gear system in the form of a harmonic gear or a two-ring compound epicyclic gear having a rated transformer ratio and an output torque that is significantly larger than what can be achieved with an ordinary planetary gear of the same size.

The pulling tool may further comprise a cable transition, a battery module including one or more batteries for operating the electric motor, an electronics module, and at least two propulsion modules.

The pulling tool may further include four propulsion modules and a nose connector.

The electric motor may include a rotor having an anchor with an output shaft and a pinion fixed to the output shaft.

The electric motor may be a brushless motor having a longitudinal axis being perpendicular to a rotational axis of the propulsion wheel, and the pulling tool may further comprise a controller for the brushless motor.

An electric actuator can be provided between the main section and the hinged propulsion arm, whereby the hinged propulsion arm is configured for assuming a first retracted position inside the propulsion module and a second actuated position against a wellbore or tubing wall.

The pulling tool may have an external diameter of less than 40 mm.

The transmission ratio between the electric motor and the propulsion wheel can be greater than 1:50, and may be between 1:50 and 1:200 or higher so that a very low gearing can be obtained.

The internally toothed gear system may be a harmonic gear.

The electric motor may include a rotor with an anchor having an output shaft and a pinion fixed to the output shaft.

The electric motor may be a brushless motor having a longitudinal axis being perpendicular to a rotational axis of the propulsion wheel, with the pulling tool further including a controller for the brushless motor.

The transmission ratio between the electric motor and the propulsion wheel of the propulsion module can be greater than 1:50.

The oval, flexible, internally toothed gear system of the propulsion module may be a harmonic gear.

This invention comprises a pulling tool having a tilting arm, a gear arrangement, and a wheel, for which an internally toothed gear system is intended to refer to a harmonic gear with a fixed inner toothing and a moving outer toothing, which moving inner toothing forms the propulsion wheel of the pulling tool.

A propulsion module for use in a wellbore, consisting of a main section and a propulsion arm including a propulsion wheel driven by a motor through a gear arrangement. The propulsion arm can be tilted away from the main section by means of an electric motor or hydraulic piston action. The principle of the tilting arm is not described in this invention.

The gear arrangement between the motor and the wheel consists of an angular gear, straight gears, and of the wheel itself.

A pulling tool includes at least one propulsion arm.

DETAILED DESCRIPTION OF THE INVENTION

Figure 1:
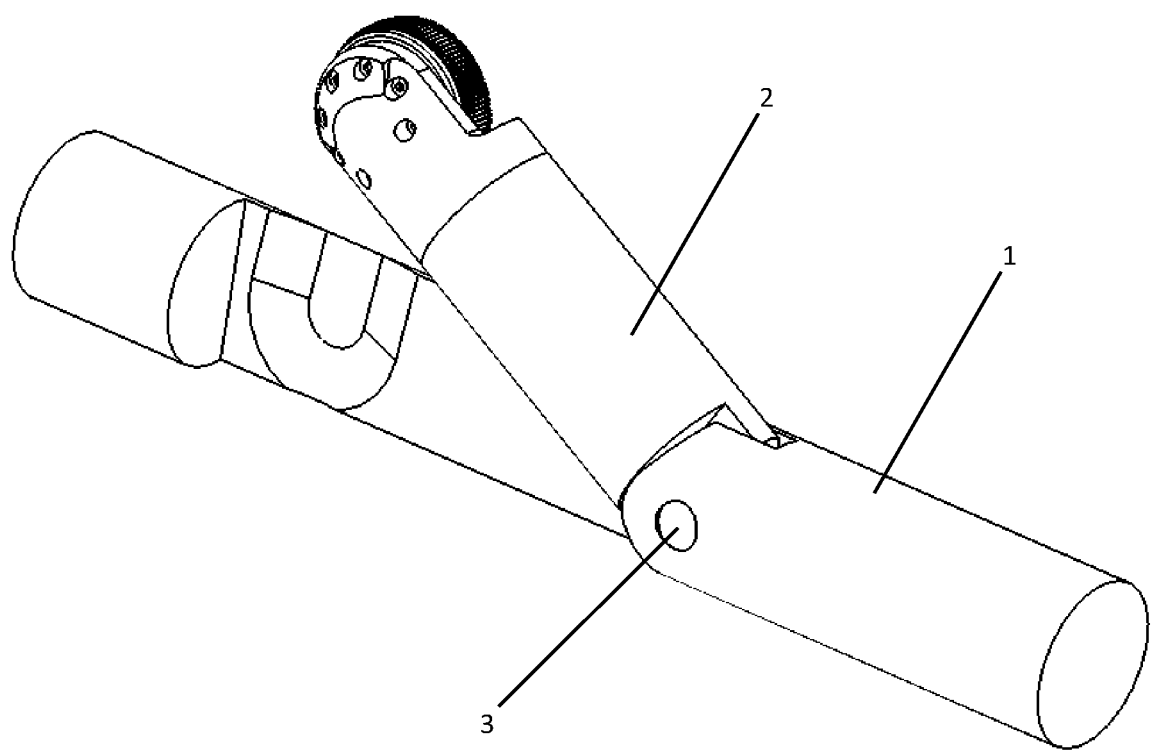
FIG. 1 shows a perspective view of an embodiment of a propulsion module of a pulling assembly according to this invention.

The invention will now be explained in more detail when a compound split ring epicyclic gear is used, with reference to the drawings:

FIG. 1 shows a perspective view of an embodiment of a pulling assembly according to this invention. The pulling assembly comprises a main section 1 supporting a complete propulsion arm 2. Complete propulsion arm 2 is connected to main section 1 via a hinge joint 3 by way of which complete propulsion arm 2 can be tilted outwards.

Figure 2:
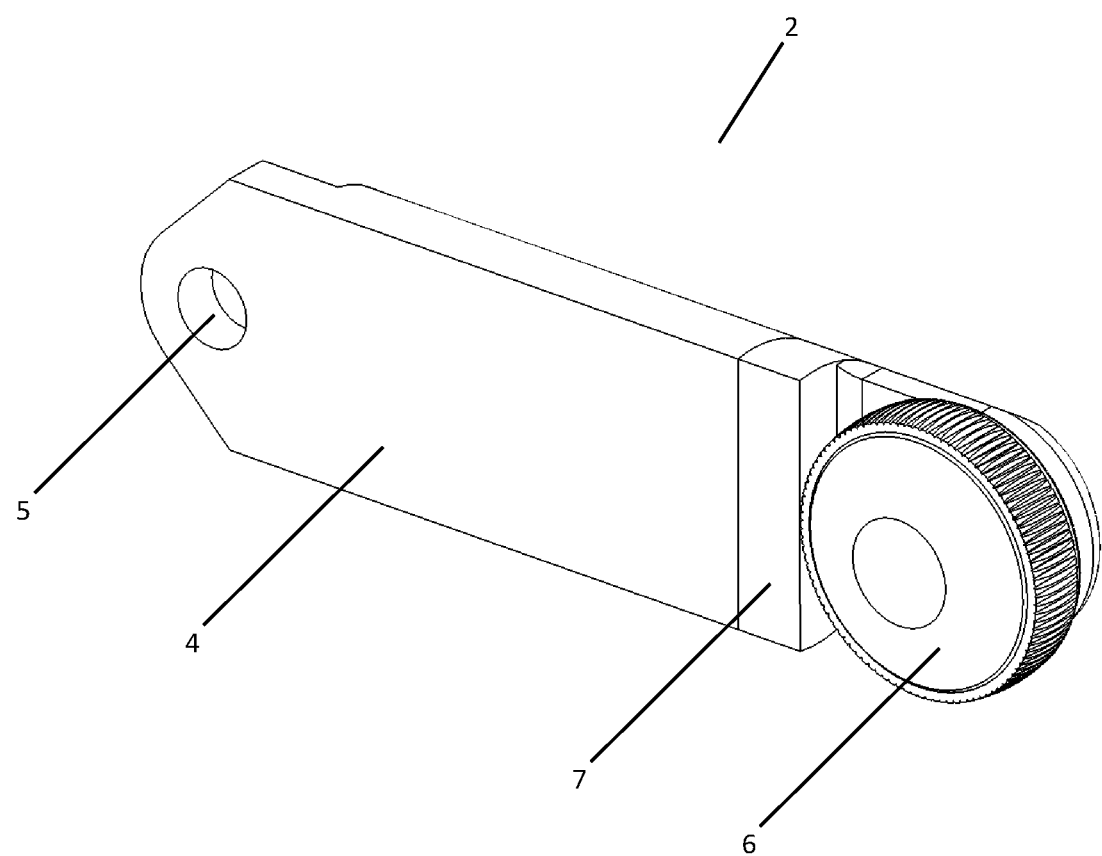
FIG. 2 shows a perspective view of the propulsion arm.
Figure 3:
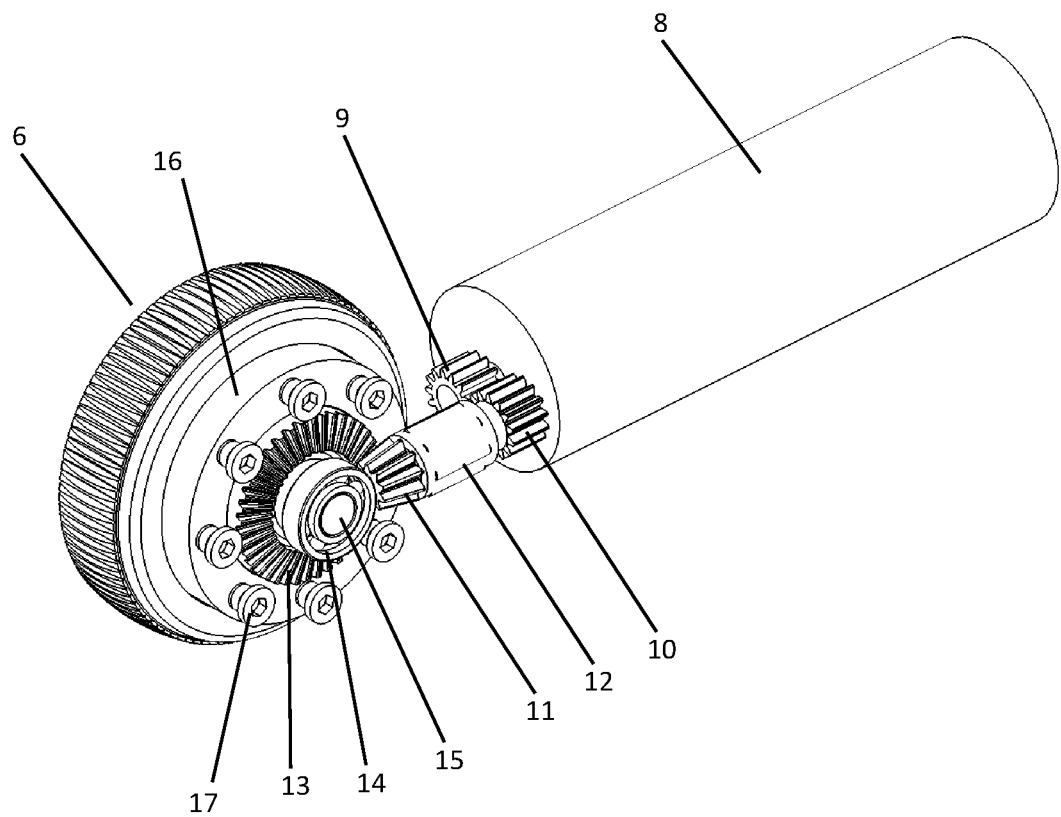
FIG. 3 shows the drive mechanism of the propulsion arm.

FIG. 2 shows complete propulsion arm 2 comprising a rear arm body 4, a pivoting hole 5, the drive mechanism of FIG. 3, a complete propulsion wheel 6 and a front arm body 7.

FIG. 3 shows the drive mechanism comprising a motor 8, a straight gear 9 fixed to the drive shaft of the motor driving a straight gear 10. Straight gear 10 is connected to an angular gear 11 supported in front arm body 7 (FIG. 2) by way of a bearing 12. Angular gear 11 is connected to an angular gear 13 being part of the complete propulsion wheel 6. The motor may be an electric, brushless motor having a longitudinal axis 62 which perpendicular to a rotational axis 65 of the propulsion wheel, with the pulling tool further including a controller 61 for the brushless motor.

The motor 8 rotates straight gear wheel 9, which transfers rotation to straight gear wheel 10 connected to angular gear 11, which transfers rotation to angular gear 13, which transfers rotation to the complete propulsion wheel 6.

Angular gear 13 is supported by way of a bearing 14 supported on a shaft 15, which is connected to angular gear 13, and of front arm body 7 (FIG. 2). Complete propulsion wheel 6 comprises a static component 16 fixed to front arm body 7 (shown in FIG. 2) by way of fixing screws 17.

Figure 4:
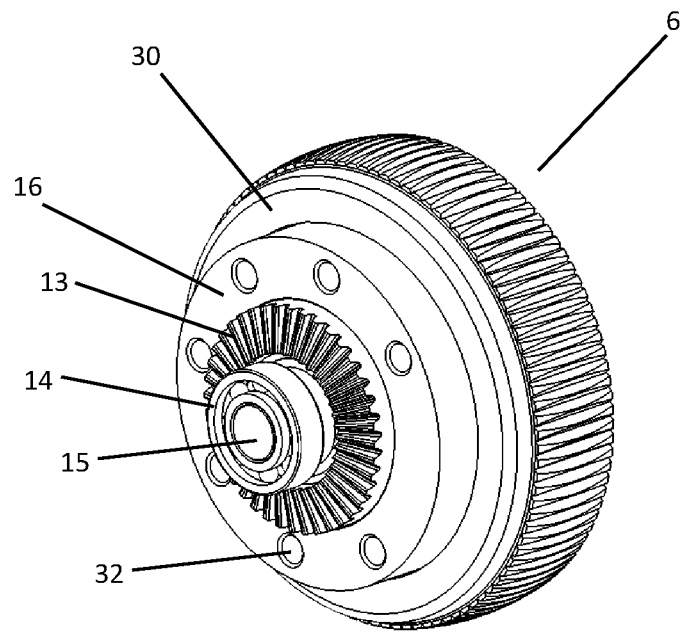
FIG. 4 shows the propulsion wheel.
Figure 5:
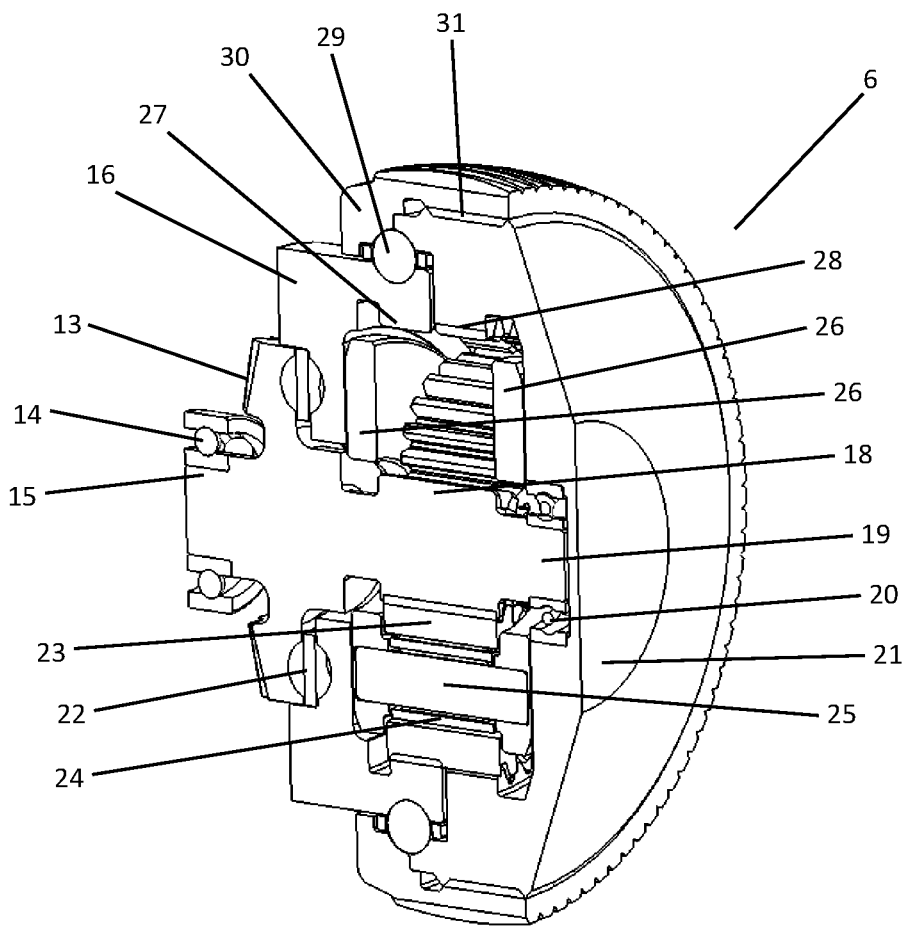
FIG. 5 shows a sectional view of the propulsion wheel with a compound split ring epicyclic gear.

FIGS. 4 and 5 show complete propulsion wheel 6 comprising a straight angular gear 13 including a straight-toothed sun wheel 18, a shaft section 19 supported by way of a bearing 20 in propulsion wheel 21. Angular gear 13 includes shaft 15, which is supported by way of bearing 14 in front arm body 7. Angular gear 13 is further axially supported by way of a bearing 22 in static component 16. Planet wheels 23 are supported by way of bearings 24 on planet carrier shafts 25. Planet holder shafts 25 are fixed to planet carrier flanges 26. Sun wheel 18 is connected to planet wheels 23, which is connected to an internal toothing 27 of static component 19 and an internal toothing 28 of propulsion wheel 21. Internal toothing 28 has a different number of teeth than internal toothing 27. When sun wheel 18 rotates planet wheels 23, which rotate against internal toothing 27, which is stationary, planet wheels 23 will rotate against internal toothing 28 at the same time so that propulsion wheel 21 rotates relative to static component 16. If the number of teeth of internal toothing 28 is greater than that of internal toothing 27, propulsion wheel 21 will rotate in the same direction as sun wheel 18. Similarly, if the number of teeth of internal toothing 27 is greater than that of internal toothing 28, propulsion wheel 21 will rotate in the opposite direction of sun wheel 18.

Propulsion wheel 21 is supported by way of a bearing 29, static component 16, and an outer propulsion wheel section 30 connected to propulsion wheel 21 by a thread 31.

Complete propulsion wheel 6 is fixed to front arm body 7 by way of bolts 17 (FIG. 3) in threaded holes 32.

Figure 6:
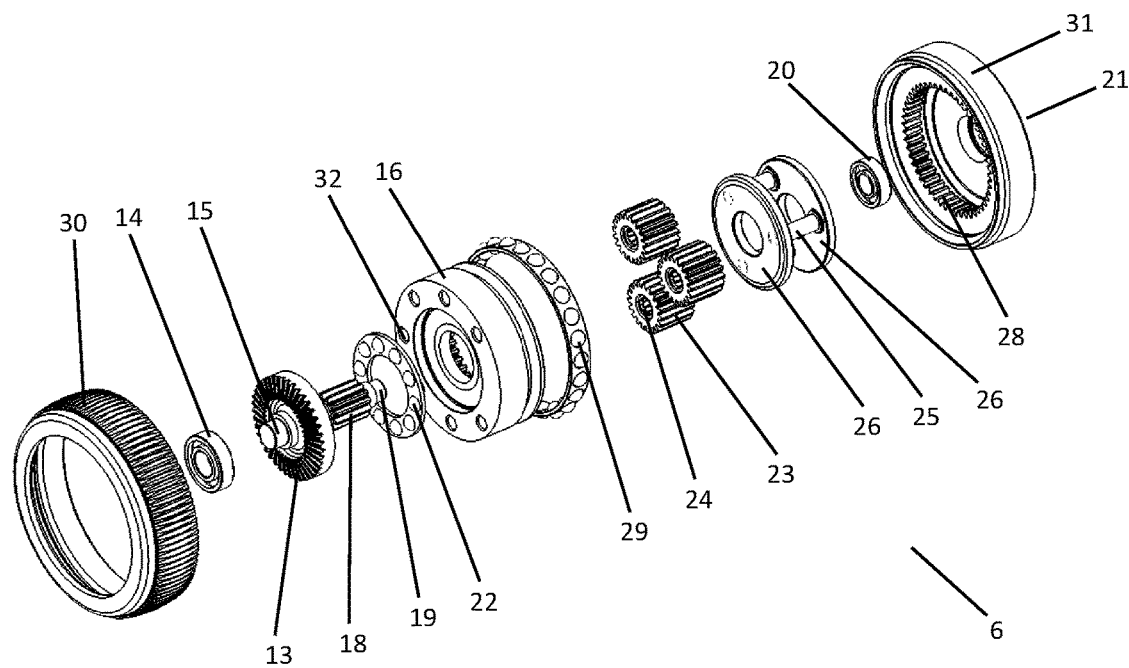
FIG. 6 shows an exploded view of the wheel with the compound split ring epicyclic gear with all parts included.
Figure 7:
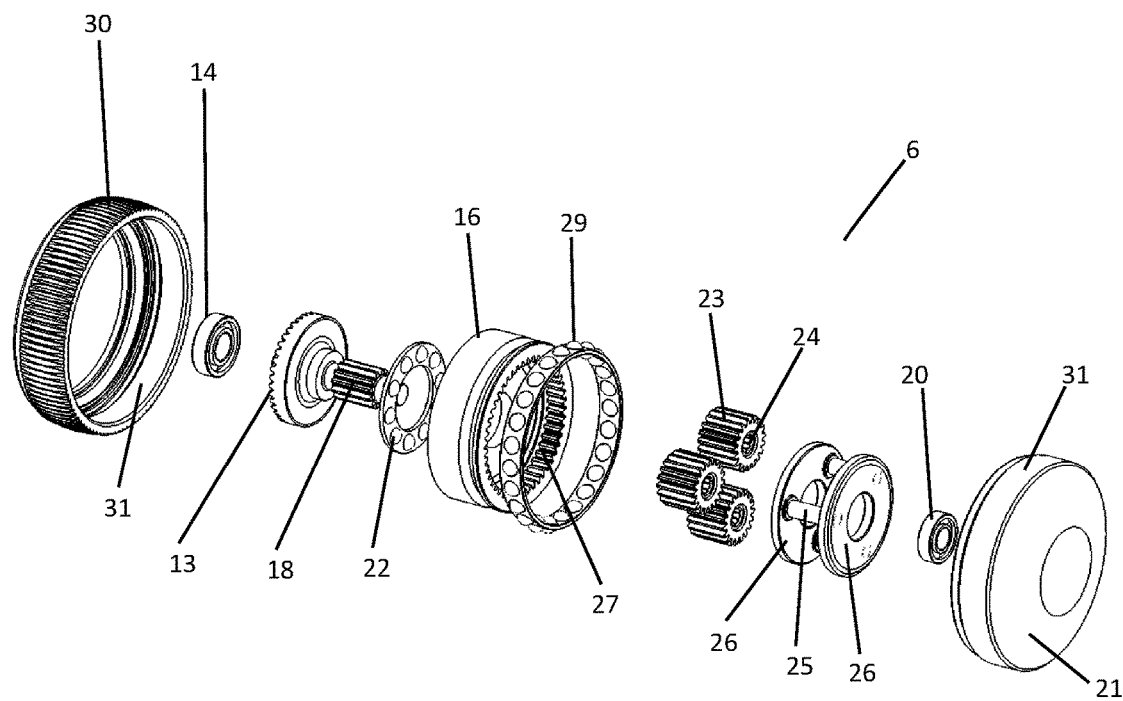
FIG. 7 shows an exploded view of the wheel with the compound split ring epicyclic gear with all parts included.

FIGS. 6 and 7 show an exploded view of complete propulsion wheel 6. Angular gear 13 includes shaft 15, sun wheel 18, and shaft 19. Bearing 14 is mounted on shaft 15 and in upper arm body 7 (FIG. 3). Bearing 20 is mounted on propulsion wheel 21. Planet wheels 23 with bearings 24 are mounted on planet carrier shafts 25, which is in turn mounted to internal toothing 28 of propulsion wheel 21. Bearing 29 is mounted on static component 16, which is mounted between propulsion wheel 21 and outer propulsion wheel section 30 by way of thread 31. Angular gear 13 is mounted to static component 16 via bearing 22 where sun wheel is connected against planet wheel 23 and shaft 19 is mounted in bearing 20.

In another embodiment of the invention, a harmonic gear with a fixed outer wheel and a moving outer wheel may be used, with the moving outer wheel forming, or being directly connected to, the propulsion wheel of the pulling tool.

Figure 8:
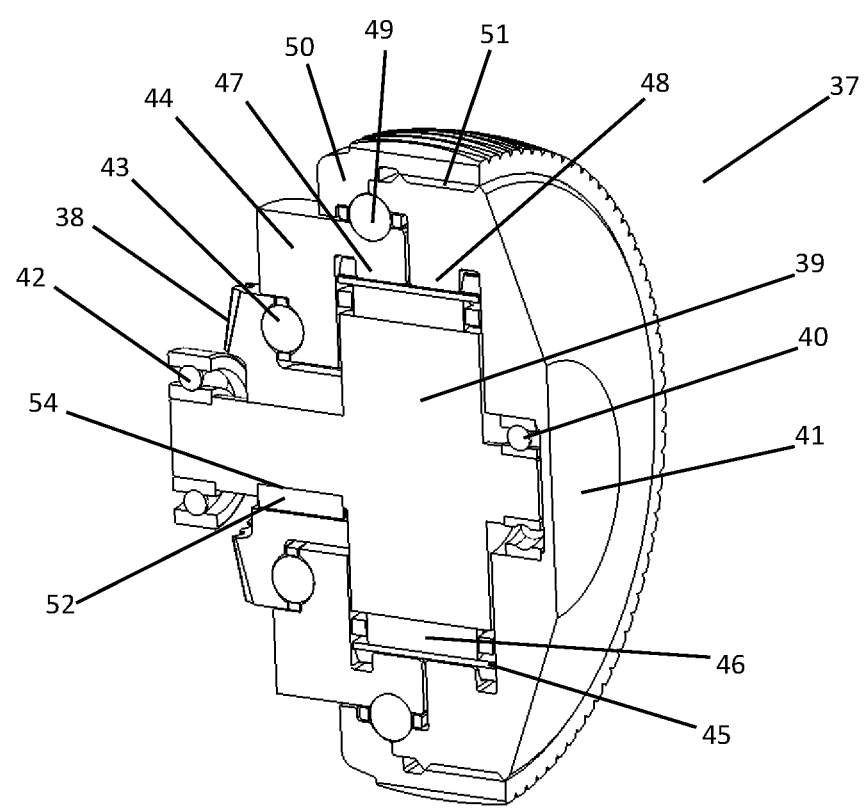
FIG. 8 shows a sectional view of the propulsion wheel with a harmonic gear.

FIG. 8 shows a complete propulsion wheel 37 comprising an angular gear 38 fixed to a wave generator 39. Angular gear 38 is supported axially by way of a bearing 43 against a static component 44. Wave generator 39 is supported by way of a bearing 40 against a propulsion wheel 41 and by way of a bearing 42 against front arm body 7. A flexible toothing 45 is supported by way of a flexible bearing 46 against wave generator 39. Flexible toothing 45 meshes with an internal toothing 47 of static component 44 and with an internal toothing 48 of propulsion wheel 41. Propulsion wheel 41 is supported by way of a bearing 49, static component 44, and an outer propulsion wheel part 50 connected to propulsion wheel 41 via a thread 51.

The number of teeth of flexible toothing 45 is lower than the number of teeth of internal toothing 47 so that when wave generator 39 rotates, flexible toothing 45 will also rotate, in the opposite direction. If there is one tooth less on flexible toothing 45 than on internal toothing 47 the flexible toothing will move around two teeth against internal toothing 47 for each turn of wave generator 39. If flexible toothing 45 and internal toothing 47 have an equal number of teeth, flexible toothing will not be rotated relative to internal toothing 47. However, for example, if internal toothing 48 has one more tooth than flexible toothing 45, then propulsion wheel will move around two teeth for each turn performed by wave generator 39 and in the same direction for wave generator 39.

Figure 9:
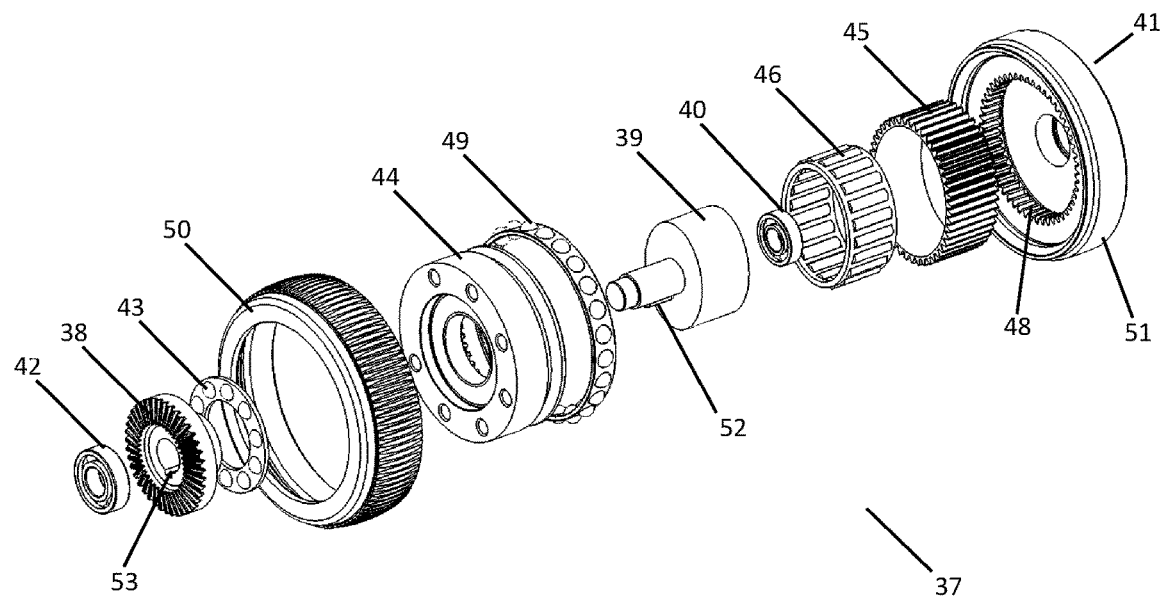
FIG. 9 shows an exploded view of the wheel with the harmonic gear with all parts included.
Figure 10:
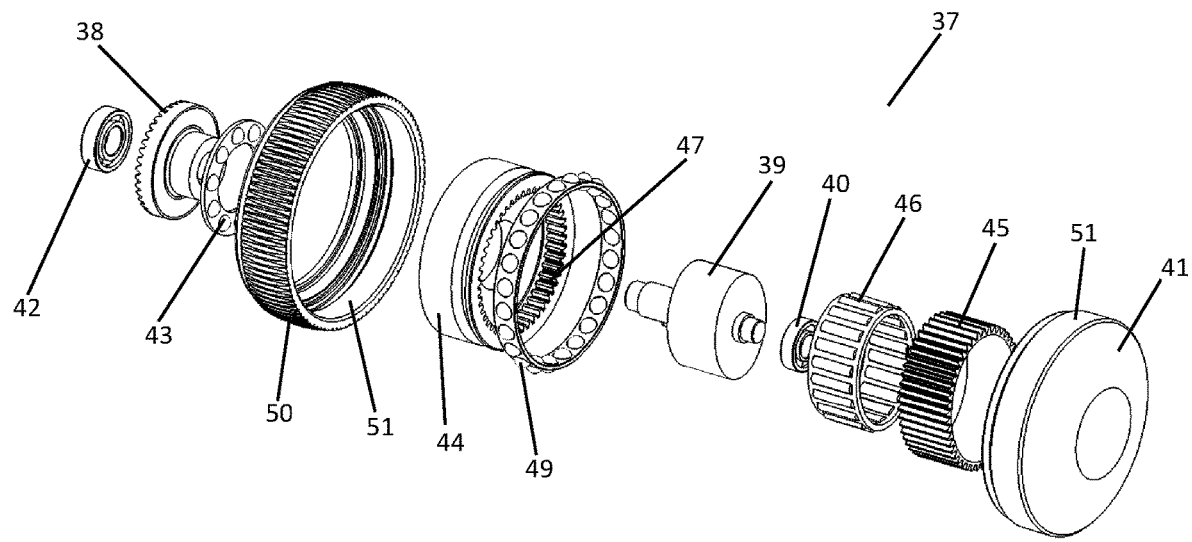
FIG. 10 shows an exploded view of the wheel with the harmonic gear with all parts included.

FIGS. 9 and 10 show exploded views of complete propulsion wheel 37. Flexible bearing 46 is mounted on wave generator 39 and flexible toothing 45 is mounted on flexible bearing 46. Bearing 40 is mounted on wave generator 30 and in propulsion wheel 41 so that flexible toothing 46 meshes with internal toothing 48. Bearing 49 is mounted on static component 44, which is mounted together with propulsion wheel 41 and outer propulsion wheel 50 by way of thread 51 so that the flexible toothing meshes with internal toothing 47. Angular gear 38 is mounted on wave generator 39 together with a key 52 in keyways 53 and 54 (FIG. 8) and against static component 44 via bearing 43.

Figure 11:
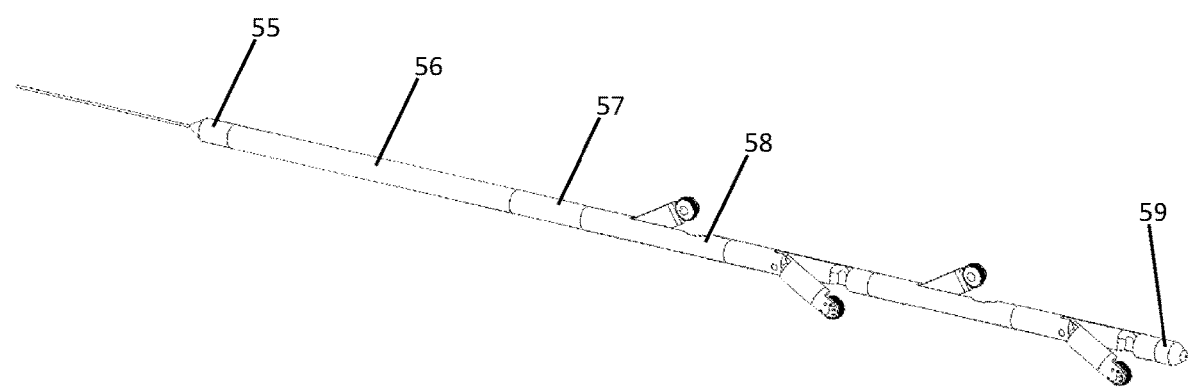
FIG. 11 shows an embodiment of a pulling tool having 4 propulsion modules.

FIG. 11 shows a battery operated pulling tool comprising a cable transition 55, a battery module 56, an electronics module 57, four propulsion modules 58, and a nose connector 59.

Figure 12:
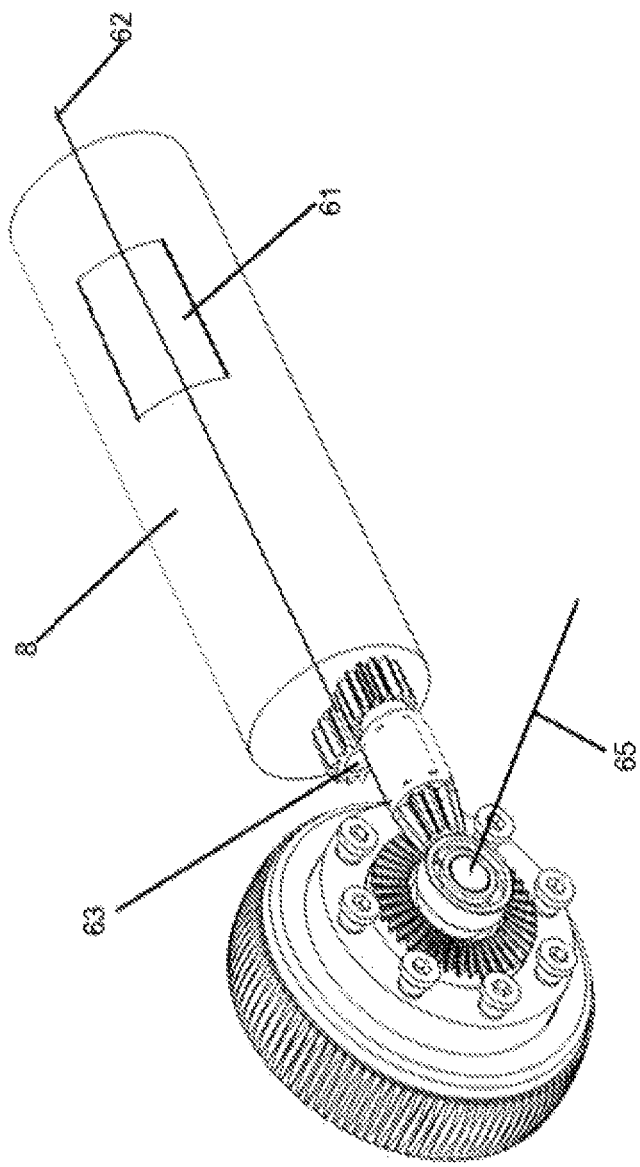
FIG. 12 shows the drive mechanism of the propulsion arm.

FIG. 12 shows the drive mechanism of the propulsion arm. The pulling tool may include an electric motor 8. The electric motor 8 may include an output shaft 63 and a pinion fixed to the output shaft 63. The electric motor 8 may be a brushless motor having a longitudinal axis 62 which is perpendicular to a rotational axis 65 of the propulsion wheel 6. The pulling tool may further comprise a controller 61 for the brushless motor 8.

Figure 13:
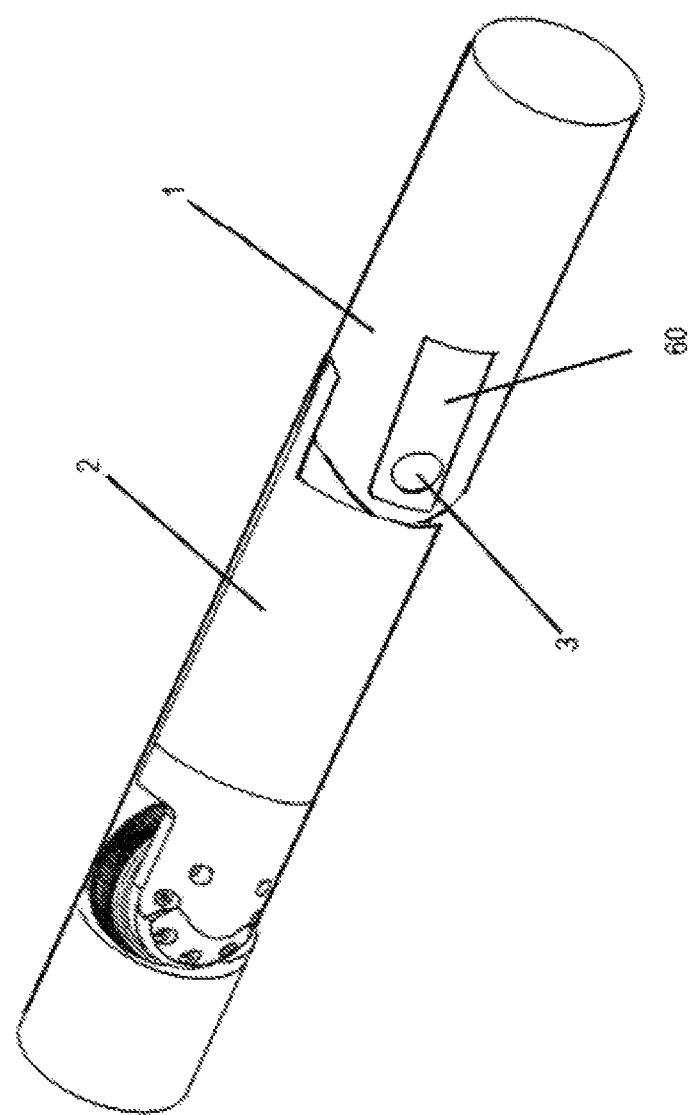
FIG. 13 shows a perspective view of an embodiment of a propulsion module of a pulling assembly.

FIG. 13 shows a perspective view of an embodiment of a propulsion module of a pulling assembly. An electric actuator 60 can be provided between the main section 1 and the hinged propulsion arm 2, whereby the hinged propulsion arm 2 is configured for assuming a first retracted position (as shown in FIG. 13) inside the propulsion module 64 and a second actuated position (as shown in FIG. 1) against a wellbore or tubing wall.

The invention claimed is:

1. A pulling tool for use in a wellbore or tubing for pulling cable, the pulling tool comprising:
   a propulsion module having a main section and a propulsion arm hinged to the main section, the propulsion arm having a complete propulsion wheel with a gear system; and
   an electric motor for driving the complete propulsion wheel via the gear system,
   wherein the gear system of the complete propulsion wheel comprises:
   a stationary internal gear rim;
   a rotary internal gear rim inside a propulsion wheel;
   an input shaft coaxially positioned relative to the stationary internal gear rim and the rotary internal gear rim of the propulsion wheel;
   at least one externally toothed body configured to mesh with the stationary internal gear rim and the rotary internal gear rim of the propulsion wheel;

wherein:
   the stationary internal gear rim and the rotary internal gear rim of the propulsion wheel having a different number of teeth; and
   the at least one externally toothed body being configured to be driven via the input shaft.

2. The pulling tool of claim 1, wherein the at least one externally toothed body is a flexible toothing supported by a flexible bearing against a wave generator configured to be driven by the input shaft, whereby the gear system of the complete propulsion wheel forms a harmonic gear.

3. The pulling tool of claim 1, wherein:
   the at least one externally toothed body comprises planet wheels in a planet wheel carrier;
   the planet wheel carrier is able to rotate freely about an axis of rotation thereof;
   the input shaft is configured to drive a sun wheel configured to mesh with the planet wheels;
   the planet wheels are configured to mesh with the stationary internal gear rim and the rotary internal gear rim of the propulsion wheel; and
   the gear system of the complete propulsion wheel forms a two-ring compound epicyclic split ring gear, of which one ring forms the stationary internal gear rim and the other ring forms the rotary internal gear rim of the propulsion wheel.

4. The pulling tool of claim 3, wherein the planet wheels have an equal number of teeth along an entire width thereof.

5. The pulling tool of claim 1, wherein the stationary internal gear rim and the rotary internal gear rim of the propulsion wheel are of a same internal diameter.

6. The pulling tool of claim 1, wherein the electric motor includes an output shaft and a pinion fixed to the output shaft.

7. The pulling tool of claim 1, wherein the electric motor is a brushless motor having a longitudinal axis which is perpendicular to a rotational axis of the propulsion wheel, and the pulling tool further includes a controller for the brushless motor.

8. The pulling tool of claim 1, further comprising an electric actuator between the main section and the propulsion arm, whereby the propulsion arm is configured to assume a first retracted position inside the propulsion module and a second actuated position against the wellbore or a wall of the tubing.

9. A propulsion module of a pulling tool for use in a wellbore or tubing, the propulsion module comprising:
   a main section;
   a propulsion arm hinged to the main section, the propulsion arm having a complete propulsion wheel with a gear system;
   an electric motor for driving the complete propulsion wheel via the gear system;
   a stationary internal gear rim;
   a rotary internal gear rim inside a propulsion wheel;
   an input shaft coaxially positioned relative to the stationary internal gear rim and the rotary internal gear rim of the propulsion wheel; and
   at least one externally toothed body configured to mesh with the stationary internal gear rim and the rotary internal gear rim of the propulsion wheel,
   wherein:
   the stationary internal gear rim and the rotary internal gear rim of the propulsion wheel have a different number of teeth; and
   the at least one externally toothed body is configured to be driven via the input shaft.

10. The propulsion module of claim 9, wherein the at least one externally toothed body is a flexible toothing supported by a flexible bearing against a wave generator configured to be driven by the input shaft, whereby the gear system of the complete propulsion wheel forms a harmonic gear.

11. The propulsion module of claim 9, wherein:
the at least one externally toothed body comprises planet wheels in a planet wheel carrier;
the planet wheel carrier is able to rotate freely about an axis of rotation thereof;
the input shaft is configured to drive a sun wheel configured to mesh with the planet wheels; and
the planet wheels are configured to mesh with the stationary internal gear rim and the rotary internal gear rim of the propulsion wheel; and
the gear system of the complete propulsion wheel forms a two-ring compound epicyclic split ring gear, of which one ring forms the stationary internal gear rim and the other ring forms the rotary internal gear rim of the propulsion wheel.

12. The propulsion module of claim 11, wherein the planet wheels have an equal number of teeth along an entire width thereof.

13. The propulsion module of claim 9, wherein the stationary internal gear rim and the rotary internal gear rim of the propulsion wheel are of a same internal diameter.

14. The propulsion module of claim 9, wherein the electric motor includes an output shaft and a pinion fixed to the output shaft.

15. The propulsion module of claim 9, wherein the electric motor is a brushless motor having a longitudinal axis which is perpendicular to a rotational axis of the propulsion wheel, and the propulsion module further includes a controller for the brushless motor.

* * * * *